US012039932B2

(12) United States Patent
Kim

(10) Patent No.: US 12,039,932 B2
(45) Date of Patent: Jul. 16, 2024

(54) PIXEL AND DISPLAY DEVICE INCLUDING PIXEL

(71) Applicant: Samsung Display Co., Ltd., Yongin-si (KR)

(72) Inventor: Keunwoo Kim, Seongnam-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/234,089

(22) Filed: Aug. 15, 2023

(65) Prior Publication Data

US 2023/0386409 A1 Nov. 30, 2023

Related U.S. Application Data

(63) Continuation of application No. 17/961,098, filed on Oct. 6, 2022, now Pat. No. 11,749,196.

(30) Foreign Application Priority Data

Mar. 2, 2022 (KR) ........................ 10-2022-0026761

(51) Int. Cl.
*G09G 3/3233* (2016.01)
*G09G 3/32* (2016.01)

(52) U.S. Cl.
CPC ............. *G09G 3/3233* (2013.01); *G09G 3/32* (2013.01); *G09G 2300/0819* (2013.01); *G09G 2300/0842* (2013.01); *G09G 2300/0861* (2013.01); *G09G 2310/08* (2013.01); *G09G 2320/0257* (2013.01); *G09G 2320/045* (2013.01); *G09G 2330/021* (2013.01)

(58) Field of Classification Search
None
See application file for complete search history.

(56) References Cited

U.S. PATENT DOCUMENTS 9,305,494 B2 * 4/2016 Shim .................... G09G 3/3291
10,482,817 B2 11/2019 Kim et al.
(Continued)

FOREIGN PATENT DOCUMENTS

CN 108154846 A 6/2018
KR 1020180064619 A 6/2018
(Continued)

*Primary Examiner* — Dorothy Harris
(74) *Attorney, Agent, or Firm* — CANTOR COLBURN LLP

(57) ABSTRACT

A pixel includes a first switching transistor, a second switching transistor, a driving transistor, and a light emitting element. The first switching transistor includes a first terminal to which a bias power supply voltage is applied, a second terminal connected to a first node, and a gate terminal to which a light emitting element initialization signal is applied. The second switching transistor includes a first terminal connected to the first node, a second terminal connected to a second node, and a gate terminal to which the light emitting element initialization signal is applied. The driving transistor includes a first terminal connected to the second node, a second terminal connected to a third node, and a gate terminal. The light emitting element is connected to the driving transistor. The first node is connected to the third node, and the bias power supply voltage is applied to the second and third nodes.

20 Claims, 10 Drawing Sheets

(56) References Cited

U.S. PATENT DOCUMENTS

| | | | | |
|---|---|---|---|---|
| 11,348,512 | B2 * | 5/2022 | Kim | G09G 3/3233 |
| 11,443,687 | B2 * | 9/2022 | Son | G09G 3/32 |
| 11,830,443 | B2 * | 11/2023 | Kim | G09G 3/3291 |
| 2011/0285691 | A1 | 11/2011 | Takasugi et al. | |
| 2017/0186832 | A1 | 6/2017 | Zhang et al. | |
| 2019/0279564 | A1 | 9/2019 | Kim et al. | |
| 2021/0027696 | A1 | 1/2021 | Kim et al. | |
| 2021/0125556 | A1 * | 4/2021 | Yamamoto | G09G 3/3233 |
| 2021/0280130 | A1 | 9/2021 | Wang et al. | |
| 2021/0383743 | A1 | 12/2021 | Yuan | |
| 2022/0122534 | A1 | 4/2022 | Kim | |
| 2022/0181420 | A1 | 6/2022 | Kim et al. | |
| 2023/0145805 | A1 * | 5/2023 | Kim | G09G 3/2096<br>345/691 |

FOREIGN PATENT DOCUMENTS

| | | | |
|---|---|---|---|
| KR | 1020190083021 | A | 7/2019 |
| KR | 1020200083858 | A | 7/2020 |
| KR | 1020210013509 | A | 2/2021 |
| KR | 1020210111945 | A | 9/2021 |
| KR | 1020220081435 | A | 6/2022 |

* cited by examiner

PIXEL AND DISPLAY DEVICE INCLUDING PIXEL

This application is a continuation of U.S. patent application Ser. No. 17/961,098, filed on Oct. 6, 2022, which claims priority to Korean Patent Application No. 10-2022-0026761, filed on Mar. 2, 2022, and all the benefits accruing therefrom under 35 U.S.C. § 119, the content of which in its entirety is herein incorporated by reference.

BACKGROUND

1. Field

Embodiments relate generally to a pixel and a display device. More particularly, embodiments of the disclosure relate to a pixel and a display device including the pixel.

2. Description of the Related Art

Flat panel display devices are used as display devices for replacing a cathode ray tube display device due to lightweight and thin characteristics thereof. Such flat panel display devices may include a liquid crystal display device, an organic light emitting display device, a quantum dot display device, and the like, for example.

Recently, a display device that may be driven at various frequencies has been developed. Such a display device may correspond to a display device with a high specification. In such a display device, it is desired to reduce power consumption of pixels included therein to increase efficiency of a battery included in the display device. In such a display device, a low-frequency driving technology for reducing a driving frequency for driving the pixels when the pixels display a still image (or when the pixels are driven at a low frequency) has been developed to reduce the power consumption of the pixels.

SUMMARY

In a display device, when pixels herein display a still image (or when the pixels are driven at a low frequency), the data signals may be distorted by a leakage current or the like of transistors included in the pixels while the pixels display an image based on data signals, and image quality of the display device may deteriorate. To prevent such distortion by the leakage current, some of switching transistors included in the pixel may be configured as N-type metal-oxide-semiconductor (NMOS) transistors, and the driving transistor may be brought into an on-bias state to shift a threshold voltage of the driving transistor in a negative direction to reduce hysteresis of a driving transistor. However, an amount by which the threshold voltage of the driving transistor is shifted in the negative direction may be relatively small, so that the image quality of the display device may still deteriorate.

Embodiments provide a pixel of a display device.

Embodiments provide a display device including the pixel.

According to embodiments of the disclosure, a pixel includes a first switching transistor, a second switching transistor, a driving transistor, and a light emitting element. In such embodiments, the first switching transistor includes a first terminal to which a bias power supply voltage is applied, a second terminal connected to a first node, and a gate terminal to which a light emitting element initialization signal is applied. The second switching transistor includes a first terminal connected to the first node, a second terminal connected to a second node, and a gate terminal to which the light emitting element initialization signal is applied. In such embodiments, the driving transistor includes a first terminal connected to the second node, a second terminal connected to a third node, and a gate terminal. In such embodiments, the light emitting element includes a first terminal electrically connected to the driving transistor. In such embodiments, the first node, which connects the first and second switching transistors to each other, is connected to the third node, and the bias power supply voltage is applied to the second and third nodes.

In an embodiment, the first switching transistor and the second switching transistor may be connected to each other in series.

In an embodiment, a voltage level of the bias power supply voltage applied to the second node may be different from a voltage level of the bias power supply voltage applied to the third node.

In an embodiment, when the bias power supply voltage is applied to the second and third nodes, the driving transistor may be in an on-bias state.

In an embodiment, the driving transistor may further include a channel and an insulating layer disposed between the gate terminal and the channel. In such an embodiment, in the on-bias state, positive electric charges emitted from the channel of the driving transistor may be trapped in the insulating layer of the driving transistor.

In an embodiment, the positive electric charges may be located to correspond to an entire top surface of the channel of the driving transistor.

In an embodiment, the pixel may further include a third switching transistor and a fourth switching transistor. In such an embodiment, the third switching transistor may include a first terminal connected to the gate terminal of the driving transistor, a second terminal connected to the third node, and a gate terminal to which a compensation gate signal is supplied. In such an embodiment, the fourth switching transistor may include a first terminal to which a first initialization voltage is supplied, a second terminal connected to the gate terminal of the driving transistor, and a gate terminal to which a data initialization gate signal is supplied.

In an embodiment, the third switching transistor may diode-connect the driving transistor in response to the compensation gate signal.

In an embodiment, the fourth switching transistor may initialize the gate terminal of the driving transistor to the first initialization voltage in response to the data initialization gate signal.

In an embodiment, the driving transistor and the first and second switching transistors may be P-type metal-oxide-semiconductor (PMOS) transistors, and the third and fourth switching transistors may be NMOS transistors.

In an embodiment, the pixel may further include a fifth switching transistor. In such an embodiment, the fifth switching transistor may include a first terminal to which a second initialization voltage is supplied, a second terminal connected to the first terminal of the light emitting element, and a gate terminal to which the light emitting element initialization signal is supplied.

In an embodiment, the fifth switching transistor may initialize the first terminal of the light emitting element to the second initialization voltage in response to the light emitting element initialization signal.

In an embodiment, the pixel may further include a sixth switching transistor and a seventh switching transistor. In such an embodiment, the sixth switching transistor may include a first terminal to which a first power supply voltage is supplied, a second terminal connected to the second node, and a gate terminal to which an emission signal is applied. In such an embodiment, the seventh switching transistor may include a first terminal connected to the third node, a second terminal connected to the first terminal of the light emitting element, and a gate terminal to which the emission signal is applied.

In an embodiment, during an activation period of the emission signal, the sixth switching transistor may supply the first power supply voltage to the first terminal of the driving transistor to allow the driving transistor to generate a driving current, and the seventh switching transistor may supply the driving current to the light emitting element.

In an embodiment, the pixel may further include an eighth switching transistor and a storage capacitor. In such an embodiment, the eighth switching transistor may include a first terminal to which a data voltage is supplied, a second terminal connected to the second node, and a gate terminal to which a data write gate signal is supplied. In such an embodiment, the storage capacitor may include a first electrode to which the first power supply voltage is applied and a second electrode connected to the gate terminal of the driving transistor.

In an embodiment, the eighth switching transistor may supply the data voltage to the first terminal of the driving transistor in response to the data write gate signal. In such an embodiment, during an inactivation period of the data write gate signal, the storage capacitor may maintain a voltage level of the gate terminal of the driving transistor.

According to embodiments of the disclosure, a display device includes a display panel, an initialization driver, and a power supply unit. In such embodiments, the display panel includes a pixel, and the pixel includes a first switching transistor, a second switching transistor, a driving transistor, and a light emitting element. In such embodiments, the first switching transistor includes a first terminal to which a bias power supply voltage is applied, a second terminal connected to a first node, and a gate terminal to which a light emitting element initialization signal is applied. In such embodiments, the second switching transistor includes a first terminal connected to the first node, a second terminal connected to a second node, and a gate terminal to which the light emitting element initialization signal is applied. In such embodiments, the driving transistor includes a first terminal connected to the second node, a second terminal connected to a third node, and a gate terminal. In such embodiments, the light emitting element includes a first terminal electrically connected to the driving transistor. In such embodiments, the initialization driver generates the light emitting element initialization signal, and provides the light emitting element initialization signal to the pixel. In such embodiments, the power supply unit generates the bias power supply voltage, and provides the bias power supply voltage to the pixel. In such embodiments, in the pixel, the first node, which connects the first and second switching transistors to each other, is connected to the third node, and the bias power supply voltage is applied to the second and third nodes.

In an embodiment, the first switching transistor and the second switching transistor may be connected to each other in series, and a voltage level of the bias power supply voltage applied to the second node may be different from a voltage level of the bias power supply voltage applied to the third node.

In an embodiment, the pixel may further include a third switching transistor and a fourth switching transistor. In such an embodiment, the third switching transistor may include a first terminal connected to the gate terminal of the driving transistor, a second terminal connected to the third node, and a gate terminal to which a compensation gate signal is supplied. In such an embodiment, the fourth switching transistor may include a first terminal to which a first initialization voltage is supplied, a second terminal connected to the gate terminal of the driving transistor, and a gate terminal to which a data initialization gate signal is supplied. In such an embodiment, the driving transistor and the first and second switching transistors may be PMOS transistors, and the third and fourth switching transistors may be NMOS transistors.

In an embodiment, the pixel may further include a fifth switching transistor, a sixth switching transistor, a seventh switching transistor, an eighth switching transistor, and a storage capacitor. In such an embodiment, the fifth switching transistor may include a first terminal to which a second initialization voltage is supplied, a second terminal connected to the first terminal of the light emitting element, and a gate terminal to which the light emitting element initialization signal is supplied. In such an embodiment, the sixth switching transistor may include a first terminal to which a first power supply voltage is supplied, a second terminal connected to the second node, and a gate terminal to which an emission signal is applied. In such an embodiment, the seventh switching transistor may include a first terminal connected to the third node, a second terminal connected to the light emitting element, and a gate terminal to which the emission signal is applied. In such an embodiment, the eighth switching transistor may include a first terminal to which a data voltage is supplied, a second terminal connected to the second node, and a gate terminal to which a data write gate signal is supplied. In such an embodiment, the storage capacitor may include a first electrode to which the first power supply voltage is applied and a second electrode connected to the gate terminal of the driving transistor.

In embodiments of the disclosure, since a pixel of the display device includes the eighth transistor and the ninth transistor, which are connected to each other in series, the bias power supply voltages having mutually different voltage levels may be applied to the first terminal of the first transistor and the second terminal of the first transistor, respectively, and a relatively large number of holes may be trapped in the gate insulating layer, such that the display device may allow the first transistor to be brought into a relatively enhanced on-bias state. Accordingly, an instantaneous afterimage may not occur in the display device.

In embodiments of the disclosure, since a pixel of the display device includes the fifth transistor having a series connection configuration, even when a relatively high current flows through the fifth transistor, a defect may not occur in the gate terminal of the fifth transistor. In such embodiments, since the high bias power supply voltage having the relatively high voltage level is applied to the first terminal of the first transistor, a relatively large number of holes may be trapped in the gate insulating layer, so that the display device may allow the first transistor to be brought into a relatively enhanced on-bias state. Accordingly, an instantaneous afterimage may not occur in the display device.

In embodiments of the disclosure, since a pixel of the display device includes the eighth transistor and the ninth transistor, which are connected to each other in series, even when the relatively high-level voltage is applied to the eighth and ninth transistors, the robustness may be obtained. In such embodiments, since the high bias power supply voltage having the relatively high voltage level is applied to the first terminal of the first transistor, the display device may allow the first transistor to be brought into a relatively enhanced on-bias state, and since the high bias power supply voltage that is a positive voltage is applied to the second gate terminal of the first transistor, the threshold voltage of the first transistor may be shifted in the negative direction. Accordingly, an instantaneous afterimage may not occur in the display device.

BRIEF DESCRIPTION OF THE DRAWINGS

The above and other features of the invention will become more apparent by describing in further detail embodiments thereof with reference to the accompanying drawings, which.

DETAILED DESCRIPTION

Figure 1:
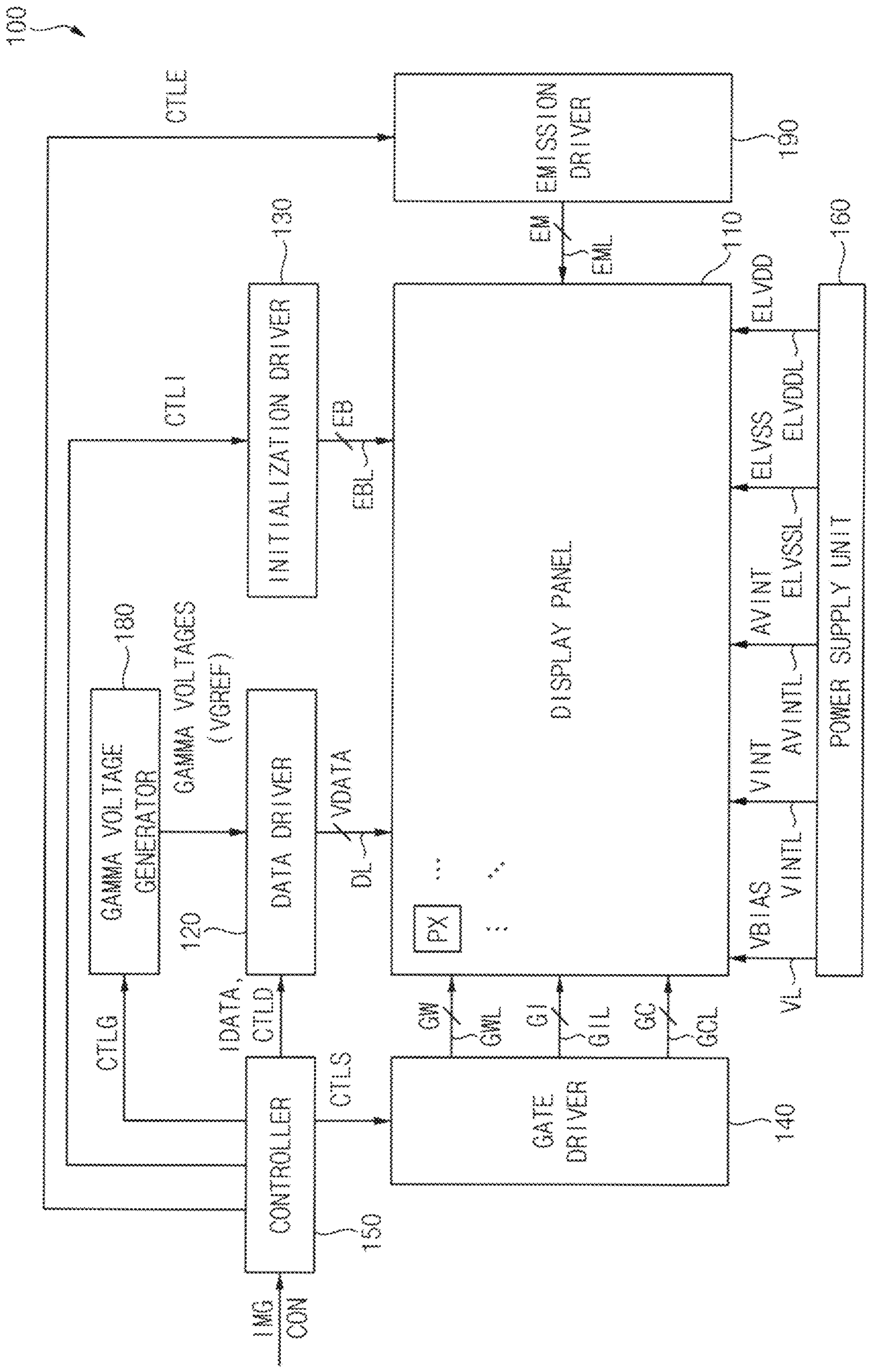
FIG. 1 is a block diagram showing a display device according to embodiments of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, pixels and a display device according to embodiments of the disclosure will be described in detail with reference to the accompanying drawings.

FIG. 1 is a block diagram showing a display device according to embodiments of the disclosure.

Referring to FIG. 1, an embodiment of a display device 100 may include a display panel 110 including a plurality of pixels PX, a controller 150, a data driver 120, a gate driver 140, an emission driver 190, a power supply unit 160, a gamma reference voltage generator 180, an initialization driver 130, and the like.

The display panel 110 may include a plurality of data lines DL, a plurality of data write gate lines GWL, a plurality of data initialization gate lines GIL, a plurality of compensation gate lines GCL, a plurality of emission lines EML, a plurality of light emitting element initialization lines EBL, a plurality of first power supply voltage lines ELVDDL, a plurality of second power supply voltage lines ELVSSL, a plurality of first initialization voltage lines VINTL, a plurality of second initialization voltage lines AVINTL, a plurality of bias power supply voltage lines VL, and a plurality of pixels PX connected to such lines.

Each of the pixels PX may include at least two transistors, at least one capacitor, and a light emitting element, and the display panel 110 may be a light emitting display panel. According to embodiments, the display panel 110 may be a display panel of an organic light emitting display device. According to alternative embodiments, the display panel 110 may include a display panel of a quantum dot display device, a display panel of a liquid crystal display device, a display panel of a field emission display device, a display panel of a plasma display device, or a display panel of an electrophoretic display device.

The controller 150 (e.g., a timing controller) may receive image data IMG and an input control signal CON from an external host processor (e.g., an application processor (AP), a graphic processing unit (GPU), or a graphic card). The image data IMG may be RGB image data including red image data, green image data, and blue image data. In addition, the image data IMG may include information on a driving frequency. The control signal CON may include a vertical synchronization signal, a horizontal synchronization signal, an input data enable signal, a master clock signal, and the like, but the embodiments are not limited thereto.

The controller 150 may convert the image data IMG into input image data IDATA by applying an algorithm (e.g., dynamic capacitance compensation (DCC)) for correcting image quality to the image data IMG supplied from the external host processor. In some embodiments, where the controller 150 does not include an algorithm for improving image quality, the image data IMG may be output as the input image data IDATA. The controller 150 may supply the input image data IDATA to the data driver 120.

The controller 150 may generate a data control signal CTLD for controlling an operation of the data driver 120, a gate control signal CTLS for controlling an operation of the gate driver 140, an emission control signal CTLE for controlling an operation of the emission driver 190, a gamma control signal CTLG for controlling an operation of the gamma reference voltage generator 180, and an initialization control signal CTLI for controlling an operation of the initialization driver 130 based on the input control signal CON. In an embodiment, for example, the gate control signal CTLS may include a vertical start signal, gate clock signals, and the like, and the data control signal CTLD may include a horizontal start signal, a data clock signal, and the like.

The gate driver 140 may generate data write gate signals GW, data initialization gate signals GI, and compensation gate signals GC based on the gate control signal CTLS received from the controller 150. The gate driver 140 may output the data write gate signals GW, the data initialization gate signals GI, and the compensation gate signals GC to the pixels PX connected to the data write gate lines GWL, the data initialization gate lines GIL, and the compensation gate lines GCL.

The emission driver 190 may generate emission signals EM based on the emission control signal CTLE received from the controller 150. The emission driver 190 may output the emission signals EM to the pixels PX connected to the emission lines EML.

The initialization driver 130 may generate light emitting element initialization signals EB based on the initialization control signal CTLI received from the controller 150. The initialization driver 130 may output the light emitting element initialization signals EB to the pixel PX connected to the light emitting element initialization lines EBL. In some embodiments, the initialization driver 130 may be formed integrally (or embedded in a same integrated circuit) with the gate driver 140 or the emission driver 190.

The power supply unit 160 may generate a bias power supply voltage VBIAS, a first initialization voltage VINT, a second initialization voltage AVINT, a first power supply voltage ELVDD, and a second power supply voltage ELVSS, and may provide the bias power supply voltage VBIAS, the first initialization voltage VINT, the second initialization voltage AVINT, the first power supply voltage ELVDD, and the second power supply voltage ELVSS to the pixels PX through the bias power supply voltage line VL, the first initialization voltage line VINTL, the second initialization voltage line AVINTL, the first power supply voltage line ELVDDL, and the second power supply voltage line ELVSSL.

The display device 100 using the bias power supply voltage VBIAS may correspond to a display device 100 with a high specification. In general, a display device may display an image at a fixed frame frequency (or a constant refresh rate) such as about 60 hertz (Hz), about 120 Hz, or about 240 Hz. However, in an embodiment of the disclosure, a frame frequency of rendering performed by the host processor (e.g., the GPU or the graphic card) configured to provide frame data to the display device 100 may not match a frame frequency of the display device 100. In an embodiment, for example, when the host processor provides frame data for a game image on which complex rendering is performed to the display device 100, such a frame frequency mismatch (i.e., a latency difference) may occur. In an embodiment, the bias power supply voltage VBIAS may be additionally provided to the display device 100 to prevent such frame frequency mismatch.

The gamma reference voltage generator 180 may generate a gamma reference voltage VGREF based on the gamma control signal CTLG received from the controller 150. The gamma reference voltage generator 180 may provide the gamma reference voltage VGREF to the data driver 120. The gamma reference voltage VGREF provided to the data driver 120 may have a value corresponding to each input image data IDATA. In some embodiments, the gamma reference voltage generator 180 may be formed integrally with the data driver 120 or the controller 150.

The data driver 120 may receive the data control signal CTLD and the input image data IDATA from the controller 150, and may receive the gamma reference voltage VGREF from the gamma reference voltage generator 180. The data driver 120 may convert digital input image data IDATA into an analog data voltage by using the gamma reference voltage VGREF. In this case, the analog data voltage obtained by the conversion will be defined as a data voltage VDATA. The data driver 120 may output data voltages VDATA to the pixels PX connected to the data lines DL based on the data control signal CTLD. According to alternative embodiments, the data driver 120 and the controller 150 may be implemented as a single integrated circuit, and such an integrated circuit may be referred to as a timing controller-embedded data driver (TED).

Figure 2:
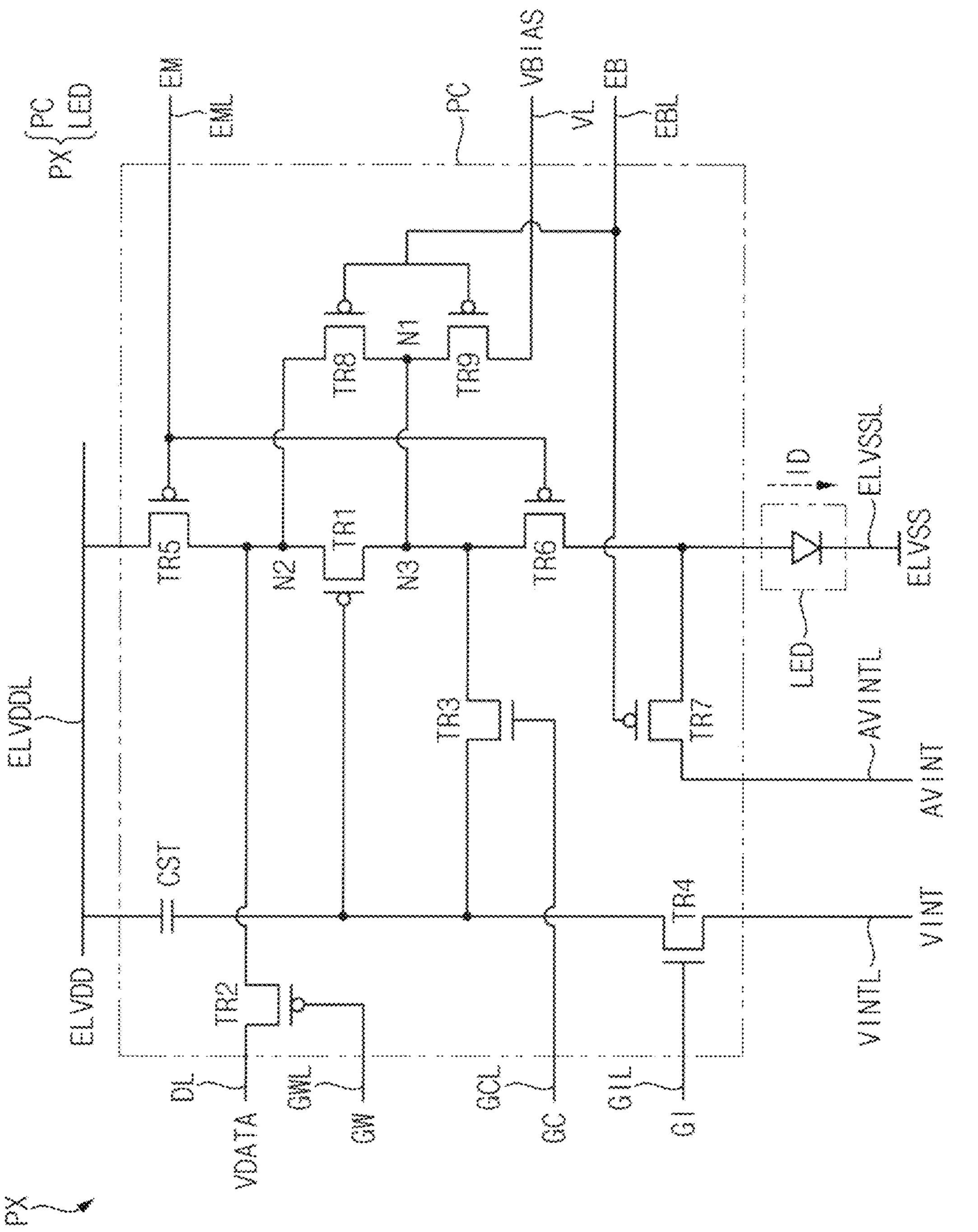
FIG. 2 is a circuit diagram showing a pixel included in a display panel of FIG. 1.
Figure 3:
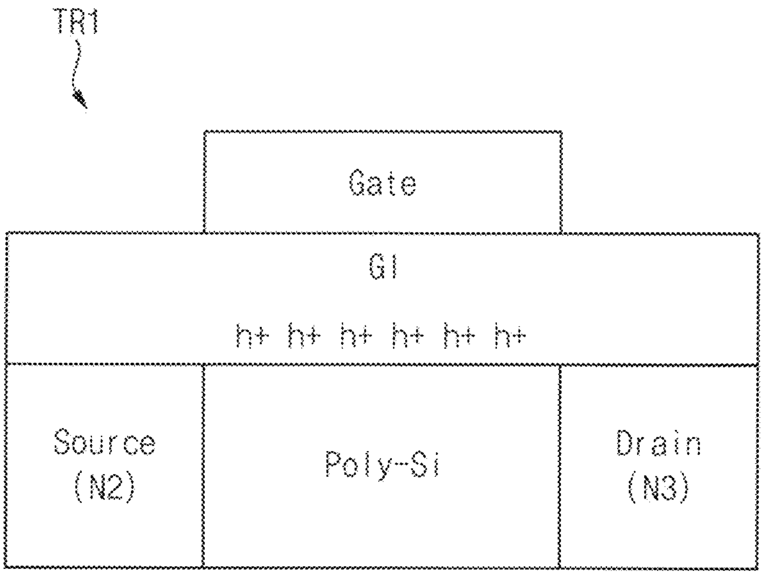
FIG. 3 is a schematic cross-sectional view showing a first transistor of FIG. 2.

FIG. 2 is a circuit diagram showing a pixel included in a display panel of FIG. 1, and FIG. 3 is a schematic cross-sectional view showing a first transistor of FIG. 2.

Referring to FIGS. 2 and 3, an embodiment of the display device 100 may include a pixel PX, and the pixel PX may include a pixel circuit PC and a light emitting element LED. In an embodiment, as shown in FIG. 2, the pixel circuit PC may include first to ninth transistors TR1, TR2, TR3, TR4, TR5, TR6, TR7, TR8, and TR9, a storage capacitor CST, and the like. In such an embodiment, the pixel circuit PC or the light emitting element LED may be connected to the bias power supply voltage line VL, the first power supply voltage line ELVDDL, the second power supply voltage line ELVSSL, the first initialization voltage line VINTL, the second initialization voltage line AVINTL, the light emitting element initialization line EBL, the data line DL, the data write gate line GWL, the data initialization gate line GIL, the compensation gate line GCL, the emission line EML, and the like. The first transistor TR1 may correspond to a driving transistor, and the second to ninth transistors TR2, TR3, TR4, TR5, TR6, TR7, TR8, and TR9 may correspond to switching transistors. Each of the first to ninth transistors TR1, TR2, TR3, TR4, TR5, TR6, TR7, TR8, and TR9 may include a first terminal, a second terminal, and a gate terminal. According to embodiments, the first terminal may be a source terminal, and the second terminal may be a drain terminal. In some embodiments, the first terminal may be a drain terminal, and the second terminal may be a source terminal.

According to embodiments, each of the first, second, fifth, sixth, seventh, eighth, and ninth transistors TR1, TR2, TR5, TR6, TR7, TR8, and TR9 may be a PMOS transistor, and may have a channel including polysilicon. In such embodiments, each of the third and fourth transistors TR3 and TR4 may be an NMOS transistor, and may have a channel including a metal oxide semiconductor.

According to the embodiments, a first node N1 at which the first terminal of the eighth transistor TR8 is connected to the second terminal of the ninth transistor TR9, a second node N2 at which the first terminal of the first transistor TR1 is connected to the second terminal of the eighth transistor TR8, and a third node N3 at which the second terminal of the first transistor TR1 is connected to the first node N1 may be defined in the pixel circuit PC.

The light emitting element LED may output a light based on a driving current ID. The light emitting element LED may include a first terminal and a second terminal. According to embodiments, the second terminal of the light emitting element LED may receive the second power supply voltage ELVSS, and the first terminal of the light emitting element LED may receive the first power supply voltage ELVDD. In such embodiments, the first power supply voltage ELVDD may be provided from the power supply unit 160 through the first power supply voltage line ELVDDL, and the second power supply voltage ELVSS may be provided from the power supply unit 160 through the second power supply voltage line ELVSSL. In an embodiment, for example, the first terminal of the light emitting element LED may be an anode terminal, and the second terminal of the light emitting element LED may be a cathode terminal. In an alternative embodiment, the first terminal of the light emitting element LED may be a cathode terminal, and the second terminal of the light emitting element LED may be an anode terminal. The light emitting element LED may be implemented as an organic light emitting diode (OLED), a quantum dot (QD) light emitting element, an inorganic light emitting diode, or the like.

The first terminal of the first transistor TR1 (e.g., a driving transistor) may be connected to the second node N2, and the first power supply voltage ELVDD or the bias power supply voltage VBIAS may be applied to the first terminal of the first transistor TR1. The second terminal of the first transistor TR1 may be connected to the third node N3, and the bias power supply voltage VBIAS may be applied to the second terminal of the first transistor TR1. The first initialization voltage VINT may be applied to the gate terminal of the first transistor TR1. In such an embodiment, the bias power supply voltage VBIAS may be provided from the power supply unit 160 through the bias power supply voltage line VL, and the first initialization voltage VINT may be provided from the power supply unit 160 through the first initialization voltage line VINTL.

The first transistor TR1 may generate the driving current ID. According to embodiments, the first transistor TR1 may operate in a saturation region. In such embodiments, the first transistor TR1 may generate the driving current ID based on a voltage difference between the gate terminal and the source terminal of the first transistor TR1. In such embodiments, gray levels may be expressed based on a magnitude of the driving current ID supplied to the light emitting element LED. In some embodiments, the first transistor TR1 may operate in a linear region. In such embodiments, the gray levels may be expressed based on a sum of a time during which the driving current is supplied to the light emitting element LED within one frame.

The gate terminal of the second transistor TR2 (e.g., an eighth switching transistor) may receive the data write gate signal GW. In this case, the data write gate signal GW may be provided from the gate driver 140 through the data write gate line GWL. The first terminal of the second transistor TR2 may receive the data voltage VDATA. In this case, the data voltage VDATA may be provided from the data driver 120 through the data line DL. The second terminal of the second transistor TR2 may be connected to the first terminal of the first transistor TR1 (or the second node N2). The second transistor TR2 may supply the data voltage VDATA to the first terminal of the first transistor TR1 during an activation period of the data write gate signal GW. In this case, the second transistor TR2 may operate in a linear region.

The gate terminal of the third transistor TR3 (e.g., a third switching transistor) may receive the compensation gate signal GC. In this case, the compensation gate signal GC may be provided from the gate driver 140 through the compensation gate line GCL. The first terminal of the third transistor TR3 may be connected to the gate terminal of the first transistor TR1. The second terminal of the third transistor TR3 may be connected to the second terminal of the first transistor TR1 (or the third node N3). In such an embodiment, the third transistor TR3 may be connected between the gate terminal of the first transistor TR1 and the second terminal of the first transistor TR1.

The third transistor TR3 may connect the gate terminal of the first transistor TR1 to the second terminal of the first transistor TR1 during an activation period of the compensation gate signal GC. In this case, the third transistor TR3 may operate in a linear region. That is, the third transistor TR3 may diode-connect the first transistor TR1 during the activation period of the compensation gate signal GC. In such an embodiment, the third transistor TR3 may diode-connect the first transistor TR1 in response to the compensation gate signal GC. When the first transistor TR1 is diode-connected, a voltage difference corresponding to a threshold voltage of the first transistor TR1 may occur between the first terminal of the first transistor TR1 and the gate terminal of the first transistor TR1. In this case, the threshold voltage may have a negative value. As a result, a voltage obtained by summing up the data voltage VDATA supplied to the first terminal of the first transistor TR1 and the voltage difference (i.e., the threshold voltage) may be supplied to the gate terminal of the first transistor TR1 during the activation period of the data write gate signal GW. In such an embodiment, the data voltage VDATA may be compensated for by the threshold voltage of the first transistor TR1, and the compensated data voltage VDATA may be supplied to the gate terminal of the first transistor TR1.

According to embodiments, the third transistor TR3 may include an NMOS transistor as described above, and the NMOS transistor may relatively reduce a leakage current. In an embodiment, for example, when the leakage current is generated in the third transistor TR3, a voltage of the gate terminal of the first transistor TR1 may be increased, and the driving current ID may be decreased, so that a luminance may be decreased. Accordingly, when the display device 100 is driven at a low frequency, the third transistor TR3 may be configured as the NMOS transistor to reduce the leakage current of the third transistor TR3 in a high gray level.

The gate terminal of the fourth transistor TR4 (e.g., a fourth switching transistor) may receive the data initialization gate signal GI. In this case, the data initialization gate signal GI may be provided from the gate driver 140 through the data initialization gate line GIL. The first terminal of the fourth transistor TR4 may receive the first initialization voltage VINT. The second terminal of the fourth transistor TR4 may be connected to the gate terminal of the first transistor TR1. In such an embodiment, the fourth transistor TR4 may be connected between the third transistor TR3 and the first initialization voltage line VINTL.

The fourth transistor TR4 may supply the first initialization voltage VINT to the gate terminal of the first transistor TR1 during an activation period of the data initialization gate signal GI. In this case, the fourth transistor TR4 may operate in a linear region. In such an embodiment, the fourth transistor TR4 may initialize the gate terminal of the first transistor TR1 to the first initialization voltage VINT during the activation period of the data initialization gate signal GI. According to embodiments, the first initialization voltage VINT may have a voltage level that is sufficiently lower than a voltage level of the data voltage VDATA maintained by the storage capacitor CST in a previous frame, and the first initialization voltage VINT may be supplied to the gate terminal of the first transistor TR1. According to alternative embodiments, the first initialization voltage VINT may have a voltage level that is sufficiently higher than the voltage level of the data voltage VDATA maintained by the storage capacitor CST in the previous frame, and the first initialization voltage VINT may be supplied to the gate terminal of the first transistor TR1. In some embodiments, the data initialization gate signal GI may be substantially the same as the data write gate signal GW of one horizontal time before. In an embodiment, for example, the data initialization gate signal GI supplied to pixels PX in an $n^{th}$ row (where n is an integer that is greater than or equal to 2) among the pixels PX included in the display device 100 may be a signal that is substantially the same as the data write gate signal GW supplied to pixels PX in an $(n-1)^{th}$ row among the pixels PX. In such an embodiment, an activated data write gate signal GW may be supplied to the pixels PX in the $(n-1)^{th}$ row among the pixels PX, so that an activated data initialization gate signal GI may be supplied to the pixels PX in the $n^{th}$ row among the pixels PX. As a result, the data voltage VDATA may be supplied to the pixels PX in the $(n-1)^{th}$ row among the pixels PX, and simultaneously, the gate terminals of the first transistors TR1 included in the pixels PX in the $n^{th}$ row among the pixels PX may be initialized to the first initialization voltage VINT.

The fourth transistor TR4 may include an NMOS transistor as described above, and the NMOS transistor may relatively reduce a leakage current. In an embodiment, for example, when the leakage current is generated in the fourth transistor TR4, the voltage of the gate terminal of the first transistor TR1 may be increased, and the driving current ID may be decrease, so that the luminance may be decreased. Accordingly, when the display device 100 is driven at the low frequency, the fourth transistor TR4 may be configured as the NMOS transistor to reduce the leakage current of the fourth transistor TR4 in the high gray level.

The gate terminal of the fifth transistor TR5 (e.g., a sixth switching transistor) may receive the emission signal EM. In this case, the emission signal EM may be provided from the emission driver 190 through the emission line EML. The first terminal of the fifth transistor TR5 may receive the first power supply voltage ELVDD. The second terminal of the fifth transistor TR5 may be connected to the first terminal of the first transistor TR1 (or the second node N2). The fifth transistor TR5 may supply the first power supply voltage ELVDD to the first terminal of the first transistor TR1 during an activation period of the emission signal EM. In such an embodiment, the fifth transistor TR5 may cut off the supply of the first power supply voltage ELVDD during an inactivation period of the emission signal EM. In this case, the fifth transistor TR5 may operate in a linear region. Since the fifth transistor TR5 supplies the first power supply voltage ELVDD to the first terminal of the first transistor TR1 during the activation period of the emission signal EM, the first transistor TR1 may generate the driving current ID. In addition, since the fifth transistor TR5 cuts off the supply of the first power supply voltage ELVDD during the inactivation period of the emission signal EM, the data voltage VDATA supplied to the first terminal of the first transistor TR1 may be supplied to the gate terminal of the first transistor TR1.

The gate terminal of the sixth transistor TR6 (e.g., a seventh switching transistor) may receive the emission signal EM. The first terminal of the sixth transistor TR6 may be connected to the second terminal of the first transistor TR1 (or the third node N3). The second terminal of the sixth transistor TR6 may be connected to the first terminal of the light emitting element LED. The sixth transistor TR6 may supply the driving current ID generated by the first transistor TR1 to the light emitting element LED during the activation period of the emission signal EM. In this case, the sixth transistor TR6 may operate in a linear region. In such an embodiment, since the sixth transistor TR6 supplies the driving current ID generated by the first transistor TR1 to the light emitting element LED during the activation period of the emission signal EM, the light emitting element LED may output the light. In addition, since the sixth transistor TR6 electrically separates the first transistor TR1 and the light emitting element LED from each other during the inactivation period of the emission signal EM, the data voltage VDATA supplied to the second terminal of the first transistor TR1 (e.g., a data voltage that has been subject to threshold voltage compensation) may be supplied to the gate terminal of the first transistor TR1.

The gate terminal of the seventh transistor TR7 (e.g., a fifth switching transistor) may receive the light emitting element initialization signal EB. In this case, the light emitting element initialization signal EB may be provided from the initialization driver 130 through the light emitting element initialization line EBL. The first terminal of the seventh transistor TR7 may receive the second initialization voltage AVINT. In this case, the second initialization voltage AVINT may be provided from the power supply unit 160 through the second initialization voltage line AVINTL. The second terminal of the seventh transistor TR7 may be connected to the first terminal of the light emitting element LED. The seventh transistor TR7 may supply the second initialization voltage AVINT to the first terminal of the light emitting element LED during an activation period of the light emitting element initialization signal EB. In this case, the seventh transistor TR7 may operate in a linear region. In such an embodiment, the seventh transistor TR7 may initialize the first terminal of the light emitting element LED to the second initialization voltage AVINT during the activation period of the light emitting element initialization signal EB.

The storage capacitor CST may be connected between the first power supply voltage line ELVDDL and the gate terminal of the first transistor TR1. The storage capacitor CST may include a first terminal and a second terminal. In an embodiment, for example, the first terminal of the storage capacitor CST may receive the first power supply voltage ELVDD, and the second terminal of the storage capacitor CST may be connected to the gate terminal of the first transistor TR1. The storage capacitor CST may maintain a voltage level of the gate terminal of the first transistor TR1 during an inactivation period of the data write gate signal GW. The inactivation period of the data write gate signal GW may include the activation period of the emission signal EM, and the driving current ID generated by the first transistor TR1 may be supplied to the light emitting element LED during the activation period of the emission signal EM. Therefore, the driving current ID generated by the first transistor TR1 may be supplied to the light emitting element LED based on the voltage level maintained by the storage capacitor CST.

The gate terminal of the eighth transistor TR8 (e.g., a second switching transistor) may receive the light emitting element initialization signal EB. The first terminal of the eighth transistor TR8 may be connected to the first node N1 (or the second terminal of the first transistor TR1). The second terminal of the eighth transistor TR8 may be connected to the second node N2 (or the first terminal of the first transistor TR1).

The gate terminal of the ninth transistor TR9 (e.g., a first switching transistor) may receive the light emitting element initialization signal EB. The first terminal of the ninth transistor TR9 may receive the bias power supply voltage VBIAS. The second terminal of the ninth transistor TR9 may be connected to the first node N1 (or the first terminal of the eighth transistor TR8).

According to embodiments, the first node N1 and the third node N3 may be connected to each other, and the eighth transistor TR8 and the ninth transistor TR9 may collectively define a dual gate transistor (or a double gate transistor, a dual gate transistor, etc.). In an embodiment, for example, the eighth transistor TR8 and the ninth transistor TR9 may be connected to each other in series, and the first node N1 may connect the eighth transistor TR8 and the ninth transistor TR9 to each other. In addition, a same signal may be applied to the gate terminal of each of the eighth and ninth transistors TR8 and TR9. In such an embodiment, the gate electrode of each of the eighth and ninth transistors TR8 and TR9 may receive the light emitting element initialization signal EB. Furthermore, the first terminal of the eighth transistor TR8 and the second terminal of the ninth transistor TR9 may be connected to each other.

The eighth and ninth transistors TR8 and TR9 may supply the bias power supply voltage VBIAS to the first terminal of the first transistor TR1 (or the second node N2) and the second terminal of the first transistor TR1 (or the third node N3) during the activation period of the light emitting element initialization signal EB. According to embodiments, a voltage level of the bias power supply voltage VBIAS provided to the second node N2 may be different from a voltage level of the bias power supply voltage VBIAS provided to the third node N3. In an embodiment, for example, the voltage level of the bias power supply voltage VBIAS provided to the second node N2 may be about 3 volts (V), and the voltage level of the bias power supply voltage VBIAS provided to the third node N3 may be about 3.1 V. In this case, a voltage difference (e.g., about 0.1 V) may occur between the second node N2 and the third node N3, so that a current may flow in the first transistor TR1, and the first transistor TR1 may be in an on-bias state. In an embodiment, the second node N2 may be connected to the second terminal of the eighth transistor TR8, and the third node N3 may be connected to the first node N1 to generate the voltage difference. In an embodiment, when the same voltage is applied to the second node N2 and the third node N3 so that the voltage difference does not occur between the first terminal of the first transistor TR1 and the second terminal of the first transistor TR1, the current may not flow in the first transistor TR1, and the first transistor TR1 may not be in the on-bias state.

In an embodiment, as shown in FIG. 3, since the bias power supply voltage VBIAS is applied to the first and second terminals of the first transistor TR1, a hole h+ emitted from the channel (e.g., polysilicon) of the first transistor TR1 may be trapped in a gate insulating layer GI, and a range in which the hole h+ is trapped may correspond to an entire top surface of the channel. In this case, the first transistor TR1 may be in a relatively enhanced on-bias state, and the threshold voltage of the first transistor TR1 may be relatively more shifted in a negative direction. In such an embodiment, hysteresis of the first transistor TR1 may be further reduced, and an instantaneous afterimage that may occur in the display device 100 may be improved.

In a conventional display device, for example, a bias power supply voltage may be applied only to a second node. In this case, a range in which a hole h+ (e.g., a positive electric charge) is trapped may correspond to a portion of a top surface of a channel of a first transistor (e.g., a top surface of the channel that is adjacent to a first terminal of the first transistor). In such a conventional display device, a number of holes h+ that are trapped may be relatively small. In this case, the first transistor may be in a relatively weak on-bias state, and a threshold voltage of the first transistor may be relatively less shifted in a negative direction. That is, hysteresis of the first transistor included in the conventional display device may not be reduced, and an instantaneous afterimage may occur in the conventional display device.

In embodiments of the disclosure, the display device 100 includes the eighth transistor TR8 and the ninth transistor TR9 that are connected to each other in series, the bias power supply voltages VBIAS having mutually different voltage levels may be applied to the first terminal of the first transistor TR1 and the second terminal of the first transistor TR1, respectively, and a relatively large number of holes h+ may be trapped in the gate insulating layer, such that the display device 100 may allow the first transistor TR1 to be brought into a relatively enhanced on-bias state. Accordingly, an instantaneous afterimage may not occur in the display device 100.

Although an embodiment of the pixel circuit PC may include one driving transistor, eight switching transistors, and one storage capacitor as shown in FIG. 2, but the configuration of the disclosure is not limited thereto. In an embodiment, for example, the pixel circuit PC may have a configuration including at least one driving transistor, at least eight switching transistors, and at least one storage capacitor.

Figure 4:
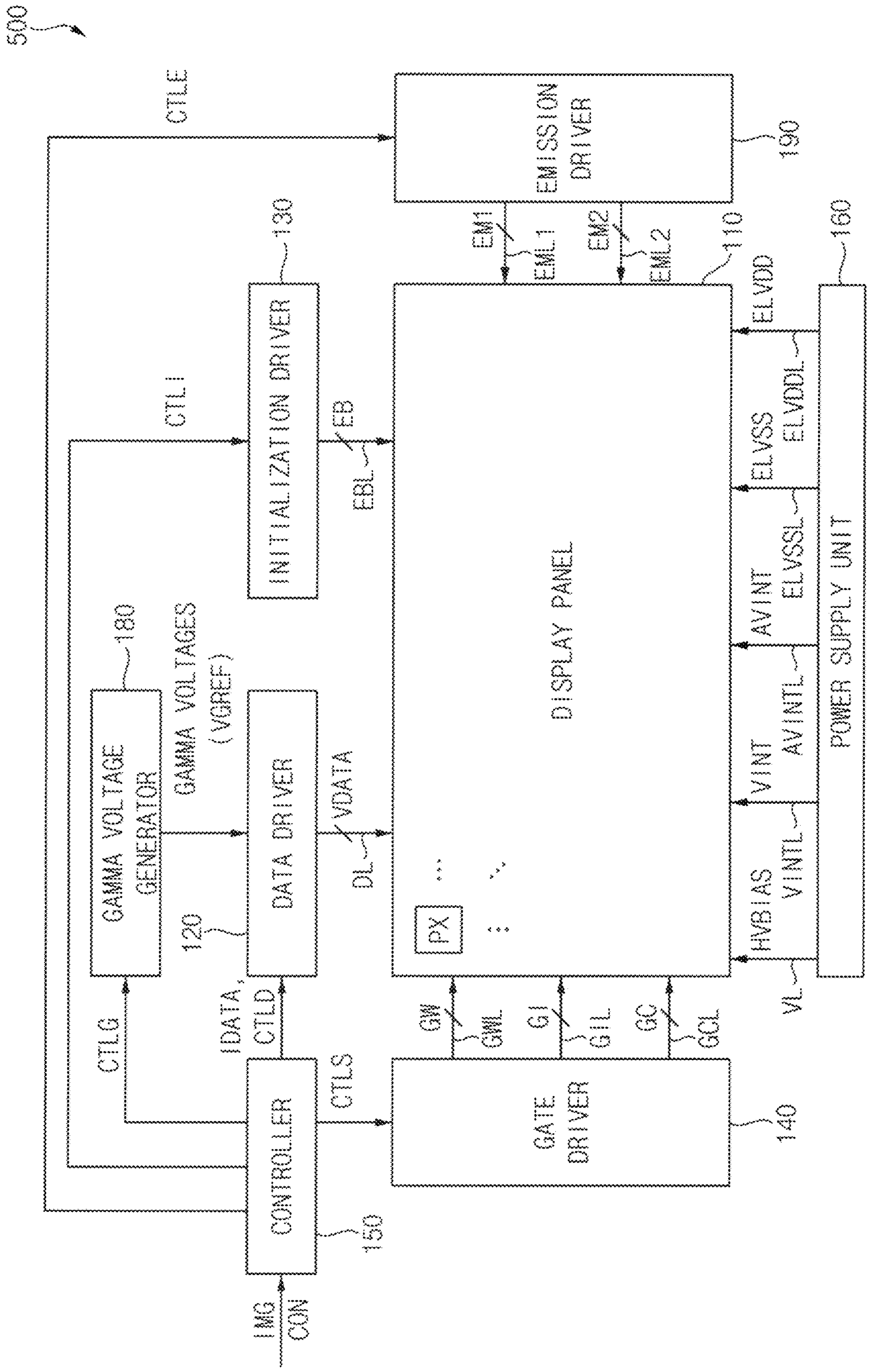
FIG. 4 is a block diagram showing a display device according to embodiments of the disclosure.

FIG. 4 is a block diagram showing a display device according to embodiments of the disclosure. A display device 500 illustrated in FIG. 4 may have a configuration that is substantially identical or similar to the configuration of the display device 100 described above with reference to FIG. 1 except for the operation of the power supply unit 160 and the operation of the emission driver 190. In FIG. 4, any repetitive detailed descriptions of components that are substantially identical or similar to the components described above with reference to FIG. 1 will be omitted or simplified.

Referring to FIG. 4, an embodiment of the display device 500 may include a display panel 110 including a plurality of pixels PX, a controller 150, a data driver 120, a gate driver 140, an emission driver 190, a power supply unit 160, a gamma reference voltage generator 180, an initialization driver 130, and the like.

The display panel 110 may include a plurality of data lines DL, a plurality of data write gate lines GWL, a plurality of data initialization gate lines GIL, a plurality of compensation gate lines GCL, a plurality of first emission lines EML1, a plurality of second emission lines EML2, a plurality of light emitting element initialization lines EBL, a plurality of first power supply voltage lines ELVDDL, a plurality of second power supply voltage lines ELVSSL, a plurality of first initialization voltage lines VINTL, a plurality of second initialization voltage lines AVINTL, a plurality of bias power supply voltage lines VL, and a plurality of pixels PX connected to the lines.

The emission driver 190 may generate first emission signals EM1 and second emission signals EM2 based on the emission control signal CTLE received from the controller 150. The emission driver 190 may output the first and second emission signals EM1 and EM2 to the pixels PX connected to the first and second emission lines EML1 and EML2.

The power supply unit 160 may generate a high bias power supply voltage HVBIAS, a first initialization voltage VINT, a second initialization voltage AVINT, a first power supply voltage ELVDD, and a second power supply voltage ELVSS, and may provide the high bias power supply voltage HVBIAS, the first initialization voltage VINT, the second initialization voltage AVINT, the first power supply voltage ELVDD, and the second power supply voltage ELVSS to the pixels PX through the bias power supply voltage line VL, the first initialization voltage line VINTL, the second initialization voltage line AVINTL, the first power supply voltage line ELVDDL, and the second power supply voltage line ELVSSL.

According to embodiments, a voltage level of the high bias power supply voltage HVBIAS may be higher than the voltage level of the bias power supply voltage VBIAS of FIG. 1. In an embodiment, for example, in a case where the voltage level of the bias power supply voltage VBIAS of FIG. 1 is about 3.5 V, the voltage level of the high bias power supply voltage HVBIAS may be about 6.5V.

Figure 5:
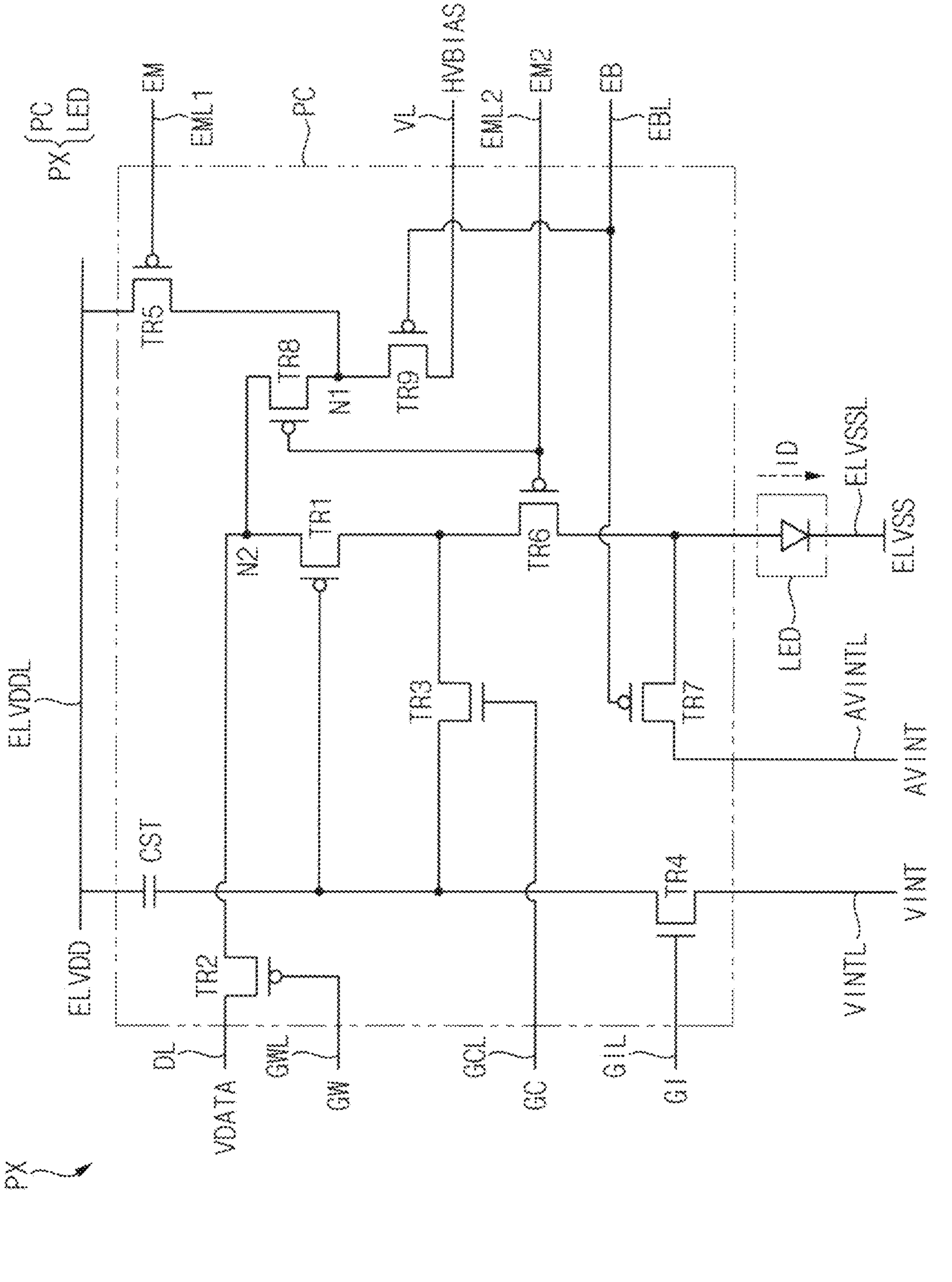
FIG. 5 is a circuit diagram showing a pixel included in a display panel of FIG. 4.
Figure 6:
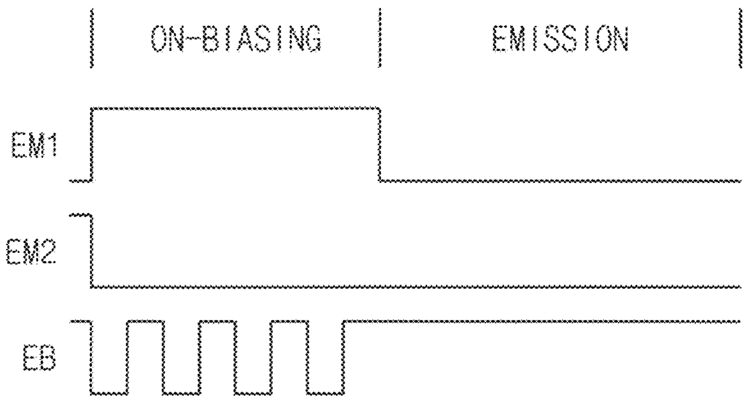
FIG. 6 is a timing diagram for describing signals for driving the pixel of FIG. 5.
Figure 7:
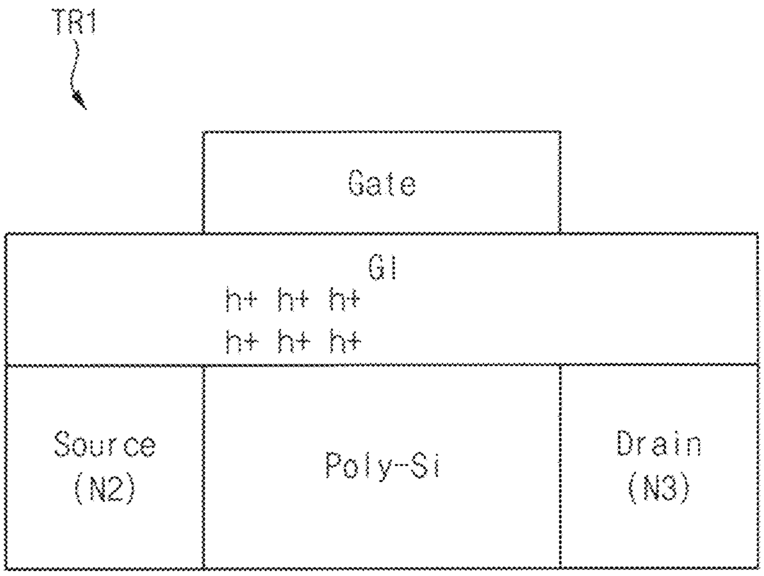
FIG. 7 is a schematic cross-sectional view showing a first transistor of FIG. 5.

FIG. 5 is a circuit diagram showing a pixel included in a display panel of FIG. 4, FIG. 6 is a timing diagram for describing signals for driving the pixel of FIG. 5, and FIG. 7 is a schematic cross-sectional view showing a first transistor of FIG. 5. A pixel PX illustrated in FIG. 5 may have a configuration that is substantially identical or similar to the configuration of the pixel PX described above with reference to FIG. 2. In FIG. 5, any repetitive detailed descriptions of components that are substantially identical or similar to the components described above with reference to FIG. 2 will be omitted or simplified.

Referring to FIGS. 4, 5, and 6, an embodiment of the display device 500 may include a pixel PX, and the pixel PX may include a pixel circuit PC and a light emitting element LED. In such an embodiment, as shown in FIG. 5, the pixel circuit PC may include first to ninth transistors TR1, TR2, TR3, TR4, TR5, TR6, TR7, TR8, and TR9, a storage capacitor CST, and the like. In addition, the pixel circuit PC or the light emitting element LED may be connected to the bias power supply voltage line VL, the first power supply voltage line ELVDDL, the second power supply voltage line ELVSSL, the first initialization voltage line VINTL, the second initialization voltage line AVINTL, the light emitting element initialization line EBL, the data line DL, the data write gate line GWL, the data initialization gate line GIL, the compensation gate line GCL, the first emission line EML1, the second emission line EML2, and the like. The first transistor TR1 may correspond to a driving transistor, and the second to ninth transistors TR2, TR3, TR4, TR5, TR6, TR7, TR8, and TR9 may correspond to switching transistors. Each of the first to ninth transistors TR1, TR2, TR3, TR4, TR5, TR6, TR7, TR8, and TR9 may include a first terminal, a second terminal, and a gate terminal. According to embodiments, the first terminal may be a source terminal, and the second terminal may be a drain terminal. In some embodiments, the first terminal may be a drain terminal, and the second terminal may be a source terminal.

According to embodiments, a first node N1 at which the first terminal of the eighth transistor TR8 is connected to the second terminal of the ninth transistor TR9 and a second node N2 at which the first terminal of the first transistor TR1 is connected to the second terminal of the eighth transistor TR8 may be defined in the pixel circuit PC.

The gate terminal of the fifth transistor TR5 may receive the first emission signal EM1. In this case, the first emission signal EM1 may be provided from the emission driver 190 through the first emission line EML1. The first terminal of the fifth transistor TR5 may receive the first power supply voltage ELVDD. The second terminal of the fifth transistor TR5 may be connected to the first node N1. The fifth transistor TR5 may supply the first power supply voltage ELVDD to the first node N1 during an activation period of the first emission signal EM1. In such an embodiment, the fifth transistor TR5 may cut off the supply of the first power supply voltage ELVDD during an inactivation period of the first emission signal EM1. In this case, the fifth transistor TR5 may operate in a linear region.

As shown in FIG. 6, in an emission period EMISSION, the first emission signal EM1 may be activated, and the second emission signal EM2 may also be activated. In such an embodiment, since the fifth transistor TR5 allows the eighth transistor TR8 to be turned on to supply the first power supply voltage ELVDD to the first terminal of the first transistor TR1 during the activation period of the first emission signal EM1, the first transistor TR1 may generate the driving current ID. In addition, since the fifth transistor TR5 cuts off the supply of the first power supply voltage ELVDD during the inactivation period of the first emission signal EM1, the data voltage VDATA supplied to the first terminal of the first transistor TR1 may be supplied to the gate terminal of the first transistor TR1.

Referring again to FIG. 5, the gate terminal of the sixth transistor TR6 may receive the second emission signal EM2. The first terminal of the sixth transistor TR6 may be connected to the second terminal of the first transistor TR1. The second terminal of the sixth transistor TR6 may be connected to the first terminal of the light emitting element LED. The sixth transistor TR6 may supply the driving current ID generated by the first transistor TR1 to the light emitting element LED during an activation period of the second emission signal EM2. In this case, the sixth transistor TR6 may operate in a linear region.

As shown in FIG. 6, in the emission period EMISSION, since the sixth transistor TR6 supplies the driving current ID generated by the first transistor TR1 to the light emitting element LED during the activation period of the second emission signal EM2, the light emitting element LED may output the light. In addition, since the sixth transistor TR6 electrically separates the first transistor TR1 and the light emitting element LED from each other during an inactivation period of the second emission signal EM2, the data voltage VDATA supplied to the second terminal of the first transistor TR1 (e.g., a data voltage that has been subject to threshold voltage compensation) may be supplied to the gate terminal of the first transistor TR1.

Referring again to FIG. 5, the gate terminal of the eighth transistor TR8 may receive the second emission signal EM2. The first terminal of the eighth transistor TR8 may be connected to the first node N1. The second terminal of the eighth transistor TR8 may be connected to the second node N2 (or the first terminal of the first transistor TR1).

The gate terminal of the ninth transistor TR9 may receive the light emitting element initialization signal EB. The first terminal of the ninth transistor TR9 may receive the high bias power supply voltage HVBIAS. The second terminal of the ninth transistor TR9 may be connected to the first node N1 (or the first terminal of the eighth transistor TR8).

According to embodiments, the fifth transistor TR5, the eighth transistor TR8, and the ninth transistor TR9 may be connected to each other through the first node N1. In an embodiment, for example, the eighth transistor TR8 and the ninth transistor TR9 may be connected to each other in series, and the fifth transistor TR5 and the eighth transistor TR8 (or the ninth transistor TR9) may be connected to each other in series. Since the fifth transistor TR5 and the eighth transistor TR8 (or the ninth transistor TR9) are connected to each other in series, even when a relatively high current flows through the fifth transistor TR5 in an aging process of a transistor, a defect may not occur in the gate terminal of the fifth transistor TR5. In this case, where a transistor is connected in series with another transistor rather than being configured as a single transistor, the transistor connected in series with the other transistor may be robust against a relatively high current.

As shown in FIG. 6, in an on-bias period ON-BIASING, the second emission signal EM2 may be activated, and the light emitting element initialization signal EB may also be activated periodically. The eighth and ninth transistors TR8 and TR9 may supply the high bias power supply voltage HVBIAS to the first terminal of the first transistor TR1 (or the second node N2) during the activation periods of the second emission signal EM2 and the light emitting element initialization signal EB. According to embodiments, a voltage level of the high bias power supply voltage HVBIAS provided to the second node N2 may be relatively high. Since the high bias power supply voltage HVBIAS is applied to the second node N2, the first transistor TR1 may be in an enhanced on-bias state.

As shown in FIG. 7, in embodiments, since the high bias power supply voltage HVBIAS is applied to the first terminal of the first transistor TR1, a hole h+ emitted from the channel (e.g., polysilicon) of the first transistor TR1 may be trapped in a gate insulating layer GI. Although a range in which the hole h+ is trapped in the gate insulating layer GI may be relatively small as compared with FIG. 3, since the high bias power supply voltage HVBIAS having a relatively high voltage level is applied to the first terminal of the first transistor TR1, the trapped hole h+ may be relatively increased. In this case, the first transistor TR1 may be in a relatively enhanced on-bias state, and the threshold voltage of the first transistor TR1 may be relatively more shifted in a negative direction. In such embodiments, hysteresis of the first transistor TR1 may be further reduced, and an instantaneous afterimage that may occur in the display device 500 may be improved.

In an embodiment, the display device 500 includes the fifth transistor TR5 having a series connection configuration, even when a relatively high current flows through the fifth transistor TR5, a defect may not occur in the gate terminal of the fifth transistor TR5.

In such an embodiment, since the high bias power supply voltage HVBIAS having the relatively high voltage level is applied to the first terminal of the first transistor TR1, a relatively large number of holes h+ may be trapped in the gate insulating layer, so that the display device 500 may allow the first transistor TR1 to be brought into a relatively enhanced on-bias state. Accordingly, an instantaneous afterimage may not occur in the display device 500.

Figure 8:
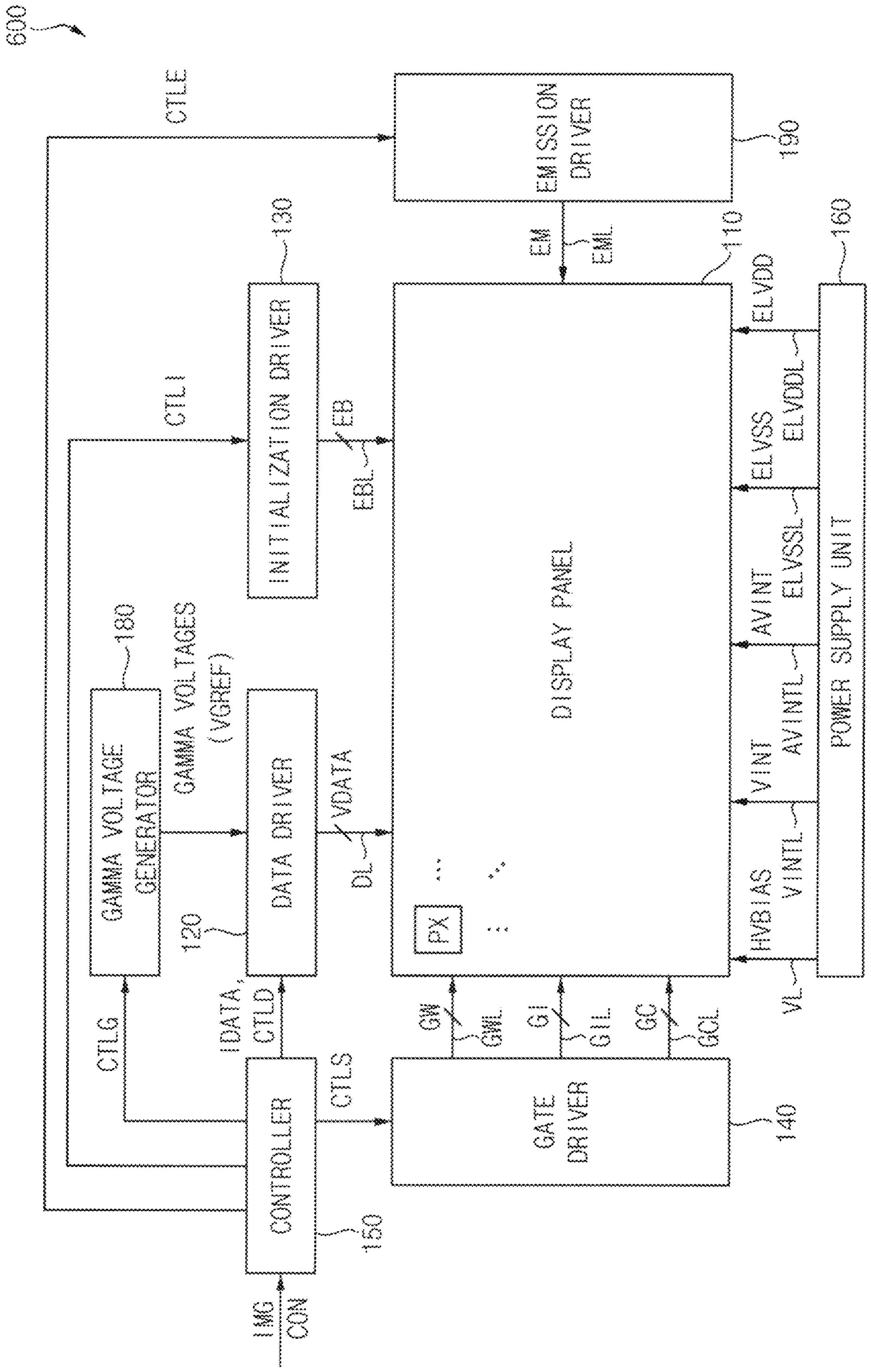
FIG. 8 is a block diagram showing a display device according to embodiments of the disclosure.

FIG. 8 is a block diagram showing a display device according to embodiments of the disclosure. A display device 600 illustrated in FIG. 8 may have a configuration that is substantially identical or similar to the configuration of the display device 100 described above with reference to FIG. 1 except for the operation of the power supply unit 160. In FIG. 8, any repetitive detailed descriptions of components that are substantially identical or similar to the components described above with reference to FIG. 1 will be omitted or simplified.

Referring to FIG. 8, an embodiment of the display device 600 may include a display panel 110 including a plurality of pixels PX, a controller 150, a data driver 120, a gate driver 140, an emission driver 190, a power supply unit 160, a gamma reference voltage generator 180, an initialization driver 130, and the like.

The power supply unit 160 may generate a high bias power supply voltage HVBIAS, a first initialization voltage VINT, a second initialization voltage AVINT, a first power supply voltage ELVDD, and a second power supply voltage ELVSS, and may provide the high bias power supply voltage HVBIAS, the first initialization voltage VINT, the second initialization voltage AVINT, the first power supply voltage ELVDD, and the second power supply voltage ELVSS to the pixels PX through the bias power supply voltage line VL, the first initialization voltage line VINTL, the second initialization voltage line AVINTL, the first power supply voltage line ELVDDL, and the second power supply voltage line ELVSSL.

According to embodiments, a voltage level of the high bias power supply voltage HVBIAS may be higher than the voltage level of the bias power supply voltage VBIAS of FIG. 1. In an embodiment, for example, in a case where the voltage level of the bias power supply voltage VBIAS of FIG. 1 is about 3.5 V, the voltage level of the high bias power supply voltage HVBIAS may be about 6.5V.

Figure 9:
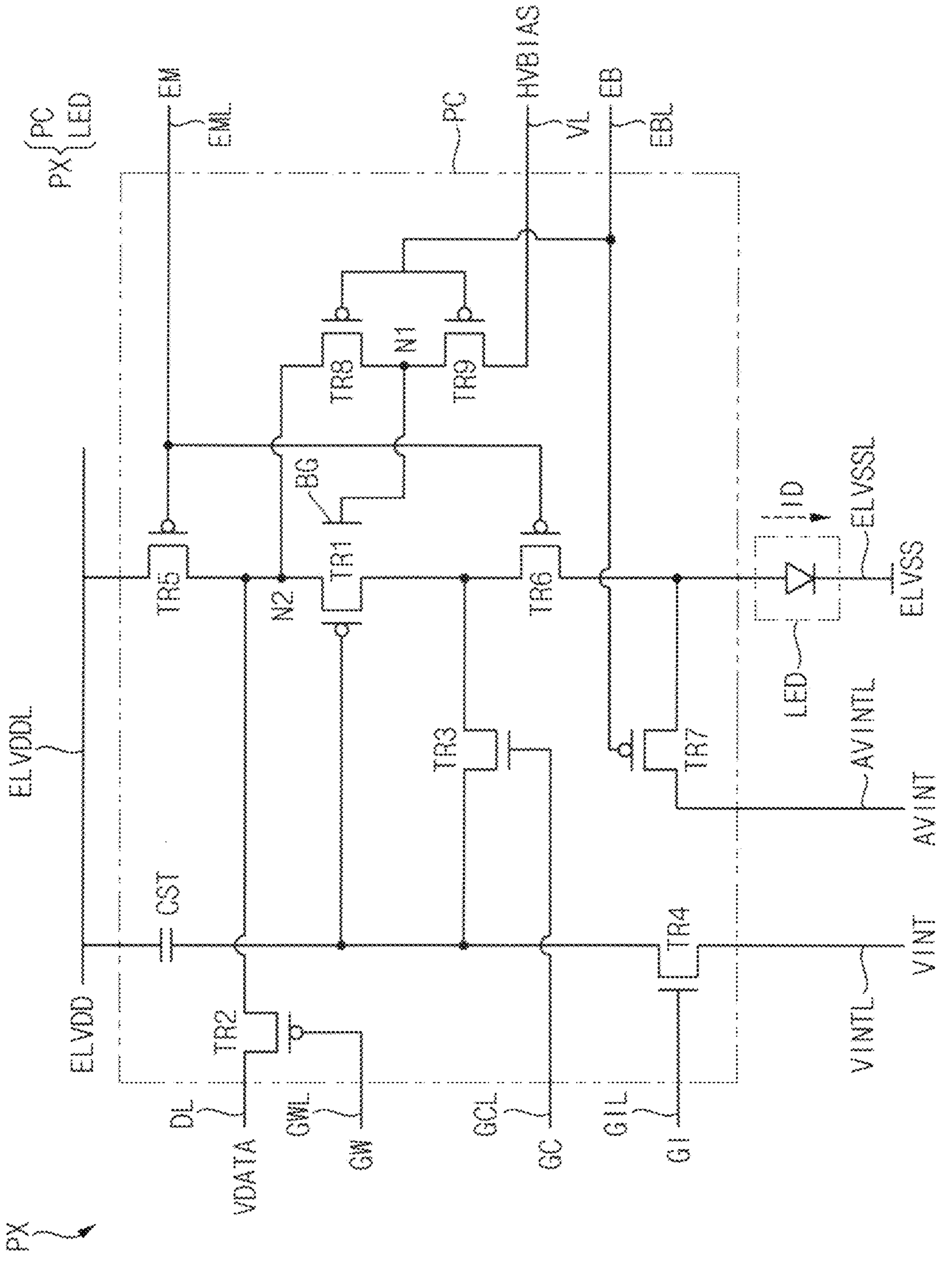
FIG. 9 is a circuit diagram showing a pixel included in a display panel of FIG. 8.

FIG. 9 is a circuit diagram showing a pixel included in a display panel of FIG. 8. A pixel PX illustrated in FIG. 9 may have a configuration that is substantially identical or similar to the configuration of the pixel PX described above with reference to FIG. 2. In FIG. 9, any repetitive detailed descriptions of components that are substantially identical or similar to the components described above with reference to FIG. 2 will be omitted or simplified.

Referring to FIG. 9, an embodiment of the display device 600 may include a pixel PX, and the pixel PX may include a pixel circuit PC and a light emitting element LED. In an embodiment, as shown in FIG. 9, the pixel circuit PC may include first to ninth transistors TR1, TR2, TR3, TR4, TR5, TR6, TR7, TR8, and TR9, a storage capacitor CST, and the like. In addition, the pixel circuit PC or the light emitting element LED may be connected to the bias power supply voltage line VL, the first power supply voltage line ELVDDL, the second power supply voltage line ELVSSL, the first initialization voltage line VINTL, the second initialization voltage line AVINTL, the light emitting element initialization line EBL, the data line DL, the data write gate line GWL, the data initialization gate line GIL, the compensation gate line GCL, the emission line EML, and the like. The first transistor TR1 may correspond to a driving transistor, and the second to ninth transistors TR2, TR3, TR4, TR5, TR6, TR7, TR8, and TR9 may correspond to switching transistors. Each of the second to ninth transistors TR2, TR3, TR4, TR5, TR6, TR7, TR8, and TR9 may include a first terminal, a second terminal, and a gate terminal. In such an embodiment, the first transistor TR1 may include a first terminal, a second terminal, a first gate terminal, and a second gate terminal BG. According to embodiments, the first terminal may be a source terminal, and the second terminal may be a drain terminal. In some embodiments, the first terminal may be a drain terminal, and the second terminal may be a source terminal.

According to embodiments, a first node N1 at which the first terminal of the eighth transistor TR8 is connected to the second terminal of the ninth transistor TR9 and a second node N2 at which the first terminal of the first transistor TR1 is connected to the second terminal of the eighth transistor TR8 may be defined in the pixel circuit PC.

The first terminal of the first transistor TR1 may be connected to the second node N2, and the first power supply voltage ELVDD or the high bias power supply voltage HVBIAS may be applied to the first terminal of the first transistor TR1. The second terminal of the first transistor TR1 may be connected to the first terminal of the sixth transistor TR6 (or the second terminal of the third transistor TR3). The first initialization voltage VINT may be applied to the first gate terminal of the first transistor TR1. The second gate terminal BG of the first transistor TR1 may be connected to the first node N1, and the high bias power supply voltage HVBIAS may be applied to the second gate terminal BG of the first transistor TR1. In an embodiment, for example, the second gate terminal BG of the first transistor TR1 may be a back gate terminal or a lower gate terminal. In such an embodiment, the high bias power supply voltage HVBIAS may be provided from the power supply unit 160 through the bias power supply voltage line VL, and the first initialization voltage VINT may be provided from the power supply unit 160 through the first initialization voltage line VINTL.

The gate terminal of the eighth transistor TR8 may receive the light emitting element initialization signal EB. The first terminal of the eighth transistor TR8 may be connected to the first node N1 (or the second gate terminal BG of the first transistor TR1). The second terminal of the eighth transistor TR8 may be connected to the second node N2 (or the first terminal of the first transistor TR1).

The gate terminal of the ninth transistor TR9 may receive the light emitting element initialization signal EB. The first terminal of the ninth transistor TR9 may receive the high bias power supply voltage HVBIAS. The second terminal of the ninth transistor TR9 may be connected to the first node N1 (or the second gate terminal BG of the first transistor TR1).

According to embodiments, the first node N1 and the second gate terminal BG of the first transistor TR1 may be connected to each other, and the eighth transistor TR8 and the ninth transistor TR9 may be defined as a dual gate transistor. In an embodiment, for example, the eighth transistor TR8 and the ninth transistor TR9 may be connected to each other in series, and the first node N1 may connect the eighth transistor TR8 and the ninth transistor TR9 to each other. In addition, a same signal may be applied to the gate terminal of each of the eighth and ninth transistors TR8 and TR9. In such an embodiment, the gate electrode of each of the eighth and ninth transistors TR8 and TR9 may receive the light emitting element initialization signal EB. Furthermore, the first terminal of the eighth transistor TR8 and the second terminal of the ninth transistor TR9 may be connected to each other.

The eighth and ninth transistors TR8 and TR9 may supply the high bias power supply voltage HVBIAS to the first terminal of the first transistor TR1 (or second node N2) and the second gate terminal BG of the first transistor TR1 during the activation period of the light emitting element initialization signal EB. According to embodiments, in a case where the eighth and ninth transistors TR8 and TR9 are connected to each other in series, even when a relatively high-level voltage (i.e., the high bias power supply voltage HVBIAS) is applied to the eighth and ninth transistors TR8 and TR9, robustness may be obtained. In such an embodiment, since the high bias power supply voltage HVBIAS is applied to the second node N2, the first transistor TR1 may be in an enhanced on-bias state, and the threshold voltage of the first transistor TR1 may be relatively more shifted in a negative direction. In addition, when the high bias power supply voltage HVBIAS that is a positive voltage is applied to the second gate terminal BG of the first transistor TR1, the threshold voltage of the first transistor TR1 may be shifted in the negative direction. In such an embodiment, hysteresis of the first transistor TR1 may be further reduced, and an instantaneous afterimage that may occur in the display device 600 may be improved.

In an embodiment, the display device 600 includes the eighth transistor TR8 and the ninth transistor TR9 that are connected to each other in series, even when the relatively high-level voltage (i.e., the high bias power supply voltage HVBIAS) is applied to the eighth and ninth transistors TR8 and TR9, the robustness may be obtained.

In such an embodiment, since the high bias power supply voltage HVBIAS having the relatively high voltage level is applied to the first terminal of the first transistor TR1, the display device 600 may allow the first transistor TR1 to be brought into a relatively enhanced on-bias state, and since the high bias power supply voltage HVBIAS that is a positive voltage is applied to the second gate terminal BG of the first transistor TR1, the threshold voltage of the first transistor TR1 may be shifted in the negative direction. Accordingly, an instantaneous afterimage may not occur in the display device 600.

Figure 10:
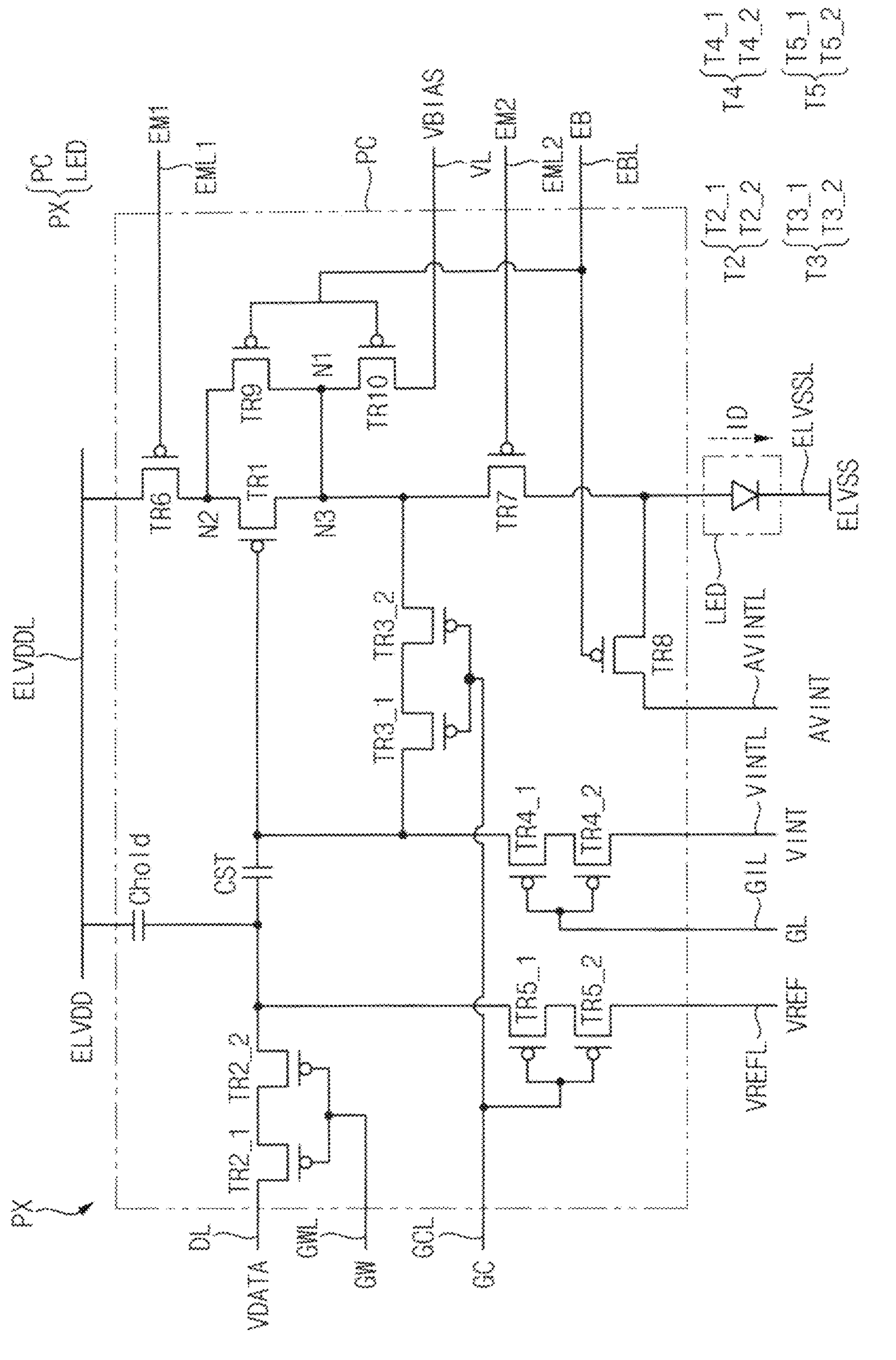
FIG. 10 is a circuit diagram showing a pixel according to embodiments of the disclosure.

FIG. 10 is a circuit diagram showing a pixel according to embodiments of the disclosure. A pixel PX included in a display device illustrated in FIG. 10 may have a configuration that is substantially identical or similar to the configuration of the pixel PX of the display device 100 described above with reference to FIGS. 1 to 3 except for some circuit configurations. In FIG. 10, any repetitive detailed descriptions of components that are substantially identical or similar to the components described above with reference to FIGS. 1 to 3 will be omitted or simplified.

Referring to FIGS. 1 and 10, an embodiment of the display device may include a display panel 110 including a plurality of pixels PX, a controller 150, a data driver 120, a gate driver 140, an emission driver 190, a power supply unit 160, a gamma reference voltage generator 180, an initialization driver 130, and the like.

The pixel PX may include a pixel circuit PC and a light emitting element LED. In an embodiment, as shown in FIG. 10, the pixel circuit PC may include first to tenth transistors TR1, TR2, TR3, TR4, TR5, TR6, TR7, TR8, TR9, and TR10, a storage capacitor CST, a holding capacitor Chold, and the like. In addition, the pixel circuit PC or the light emitting element LED may be connected to the bias power supply voltage line VL, the first power supply voltage line ELVDDL, the second power supply voltage line ELVSSL, a reference voltage line VREFL, the first initialization voltage line VINTL, the second initialization voltage line AVINTL, the light emitting element initialization line EBL, the data line DL, the data write gate line GWL, the data initialization gate line GIL, the compensation gate line GCL, a first emission line EML1, a second emission line EML2, and the like. Furthermore, the first transistor TR1 may correspond to a driving transistor, and the second to tenth transistors TR2, TR3, TR4, TR5, TR6, TR7, TR8, TR9, and TR10 may correspond to switching transistors.

According to embodiments, the second transistor TR2, the third transistor TR3, the fourth transistor TR4, and the fifth transistor TR5 may function as (or be configured as or defined by) dual gate transistors. In an embodiment, for example, the second transistor TR2 may include a first sub-transistor TR2_1 and a second sub-transistor TR2_2, and the same gate signal may be applied to a gate terminal of each of the first and second sub-transistors TR2_1 and TR2_2. In addition, the third transistor TR3 may include a third sub-transistor TR3_1 and a fourth sub-transistor TR3_2, and a same gate signal may be applied to a gate terminal of each of the third and fourth sub-transistors TR3_1 and TR3_2. In addition, the fourth transistor TR4 may include a fifth sub-transistor TR4_1 and a sixth sub-transistor TR4_2, and a same gate signal may be applied to a gate terminal of each of the fifth and sixth sub-transistors TR4_1 and TR4_2. Furthermore, the fifth transistor TR5 may include a seventh sub-transistor TR5_1 and an eighth sub-transistor TR5_2, and a same gate signal may be applied to a gate terminal of each of the seventh and eighth sub-transistors TR5_1 and TR5_2.

In an embodiment, each of the first to tenth transistors TR1, TR2, TR3, TR4, TR5, TR6, TR7, TR8, TR9, and TR10 may be a PMOS transistor, and may have a channel including polysilicon.

In such an embodiment, a first node N1 at which a first terminal of the ninth transistor TR9 is connected to a second terminal of the tenth transistor TR10, a second node N2 at which a first terminal of the first transistor TR1 is connected to a second terminal of the ninth transistor TR9, and a third node N3 at which a second terminal of the first transistor TR1 is connected to the first node N1 may be defined in the pixel circuit PC.

In an embodiment, for example, the pixel PX shown in FIG. 10 may correspond to a pixel driven at a high frequency. Since the bias power supply voltage VBIAS is applied to the first and second terminals of the first transistor TR1 corresponding to the driving transistor of the pixel driven at the high frequency, a hole h+ emitted from the channel of the first transistor TR1 may be trapped in a gate insulating layer GI, and a range in which the hole h+ is trapped may correspond to an entire top surface of the channel. In this case, the first transistor TR1 may be in a relatively enhanced on-bias state, and the threshold voltage of the first transistor TR1 may be relatively more shifted in a negative direction. In such an embodiment, hysteresis of the first transistor TR1 may be further reduced, and an instantaneous afterimage that may occur in the display device may be improved.

Figure 11:
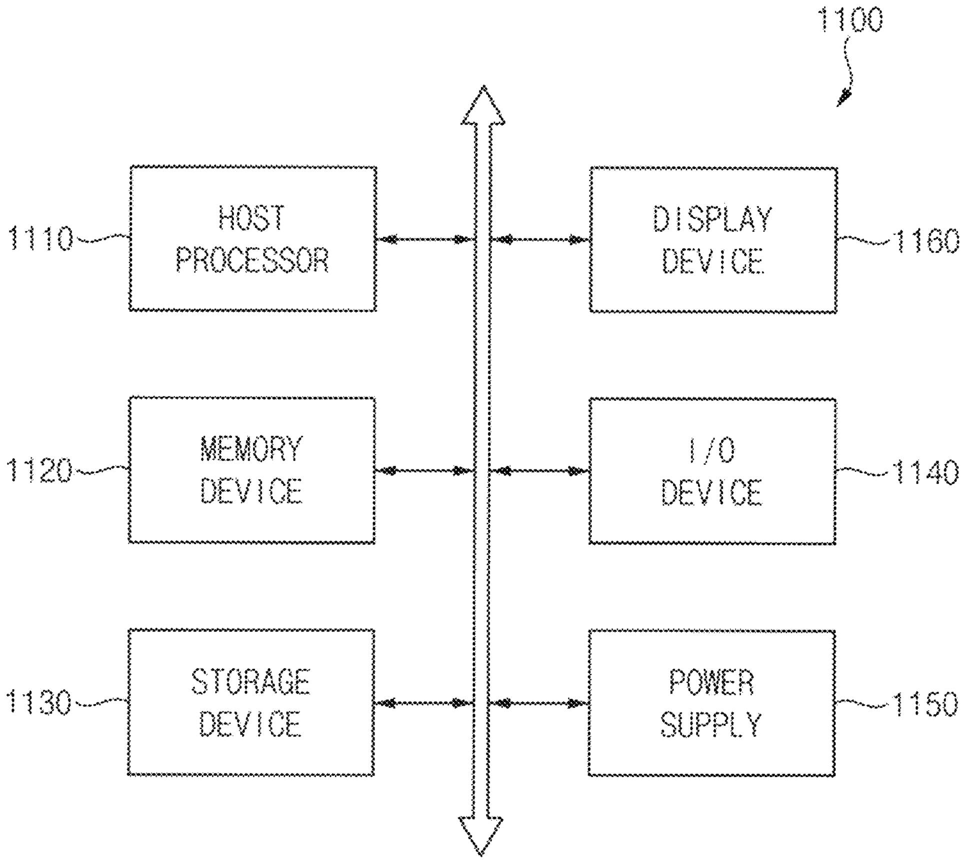
FIG. 11 is a block diagram illustrating an electronic device including a display device according to embodiments of the disclosure.

FIG. 11 is a block diagram illustrating an electronic device including a display device according to embodiments of the disclosure.

Referring to FIG. 11, an embodiment of an electronic device 1100 may include a processor 1110, a memory device 1120, a storage device 1130, an input/output (I/O) device 1140, a power supply 1150, and a display device 1160. The electronic device 1100 may further include a plurality of ports for communicating with a video card, a sound card, a memory card, a universal serial bus (USB) device, other electric devices, etc.

The processor 1110 may perform various computing functions or tasks. The processor 1110 may be an application processor (AP), a micro processor, a central processing unit (CPU), etc. The processor 1110 may be coupled to other components via an address bus, a control bus, a data bus, etc. Further, in embodiments, the processor 1110 may be further coupled to an extended bus such as a peripheral component interconnection (PCI) bus.

The memory device 1120 may store data for operations of the electronic device 1100. In an embodiment, for example, the memory device 1120 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc., and/or at least one volatile memory device such as a dynamic random access memory (DRAM)

device, a static random access memory (SRAM) device, a mobile dynamic random access memory (mobile DRAM) device, etc.

The storage device 1130 may be a solid state drive (SSD) device, a hard disk drive (HDD) device, a CD-ROM device, etc. The I/O device 1140 may be an input device such as a keyboard, a keypad, a mouse, a touch screen, etc., and an output device such as a printer, a speaker, etc. The power supply 1150 may supply power for operations of the electronic device 1100. The display device 1160 may be coupled to other components through the buses or other communication links.

The display device 1160 may include a display panel including a plurality of pixels, a controller, a data driver, a gate driver, an emission driver, a power supply unit, a gamma reference voltage generator, an initialization driver, and the like. Here, each of the pixels may include a pixel circuit and a light emitting element, and the pixel circuit may include first to ninth transistors, a storage capacitor, and the like. In addition, the first transistor may correspond to a driving transistor, and the second to ninth transistors may correspond to switching transistors. In embodiments, the first node and the third node may be connected to each other, and the eighth transistor and the ninth transistor may be connected to each other in series. Since the bias power supply voltage is applied to the first and second terminals of the first transistor, a hole emitted from the channel of the first transistor may be trapped in a gate insulating layer, and a range in which the hole is trapped may correspond to an entire top surface of the channel. In this case, the first transistor may be in a relatively enhanced on-bias state, and the threshold voltage of the first transistor may be relatively more shifted in a negative direction. In such an embodiment, hysteresis of the first transistor may be further reduced, and an instantaneous afterimage that may occur in the display device 1160 may be improved.

According to embodiments, the electronic device 1100 may be any electronic device including the display device 1160 such as a smart phone, a wearable electronic device, a tablet computer, a mobile phone, a television (TV), a digital TV, a three-dimensional (3D) TV, a personal computer, a home appliance, a laptop computer, a personal digital assistant (PDA), a portable multimedia player (PMP), a digital camera, a music player, a portable game console, a navigation device, or the like.

Embodiments of the disclosure may be applied to various electronic devices including a display device. Embodiments of the disclosure may be applied to numerous electronic devices such as vehicle-display devices, ship-display devices, aircraft-display devices, portable communication devices, exhibition display devices, information transfer display devices, medical-display devices, etc., for example The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A pixel comprising:

a first switching transistor including a first terminal to which a bias power supply voltage is applied, a second terminal connected to a first node, and a gate terminal to which a light emitting element initialization signal is applied;

a second switching transistor including a first terminal connected to the first node, a second terminal connected to a second node, and a gate terminal to which the light emitting element initialization signal is applied;

a driving transistor including a first terminal connected to the second node, a second terminal connected to a third node that is connected to the first node, and a gate terminal; and a light emitting element including a first terminal electrically connected to the driving transistor and a second terminal to which a second power supply voltage is supplied, wherein the bias power supply voltage having a first voltage level is applied to the second node via the first and second switching transistors when the first and second switching transistors are turned on, and wherein the bias power supply voltage having a second voltage level is applied to the third node via the first switching transistor when the first and second switching transistors are turned on.

2. The pixel of claim 1, wherein the first switching transistor and the second switching transistor are connected to each other in series.

3. The pixel of claim 1, wherein the first voltage level of the bias power supply voltage is different from the second voltage level of the bias power supply voltage.

4. The pixel of claim 1, wherein the driving transistor is in an on-bias state when the bias power supply voltage having the first voltage level is applied to the second node and when the bias power supply voltage having the second voltage level is applied to the third node.

5. The pixel of claim 1, further comprising:

a third switching transistor including a first terminal connected to the gate terminal of the driving transistor, a second terminal connected to the third node, and a gate terminal to which a compensation gate signal is supplied, wherein the third switching transistor diode-connects the driving transistor when the third switching transistor is turned on.

6. The pixel of claim 1, further comprising:

a fourth switching transistor including a first terminal to which a first initialization voltage is supplied, a second terminal connected to the gate terminal of the driving transistor, and a gate terminal to which a data initialization gate signal is supplied, wherein the fourth switching transistor initializes the gate terminal of the driving transistor to the first initialization voltage when the fourth switching transistor is turned on.

7. The pixel of claim 1, further comprising:

a fifth switching transistor including a first terminal to which a second initialization voltage is supplied, a second terminal connected to the first terminal of the light emitting element, and a gate terminal to which the light emitting element initialization signal is supplied, wherein the fifth switching transistor initializes the first terminal of the light emitting element to the second initialization voltage when the fifth switching transistor is turned on.

8. The pixel of claim 1, further comprising:

a sixth switching transistor including a first terminal to which a first power supply voltage that is higher than the second power supply voltage is supplied, a second terminal connected to the second node, and a gate terminal to which an emission signal is applied; and a seventh switching transistor including a first terminal connected to the third node, a second terminal connected to the first terminal of the light emitting element, and a gate terminal to which the emission signal is applied, wherein the sixth and seventh switching transistors allow a driving current generated by the driving transistor to flow through the light emitting element between the first power supply voltage and the second power supply voltage when the sixth and seventh switching transistors are turned on.

9. The pixel of claim 1, further comprising:

an eighth switching transistor including a first terminal to which a data voltage is supplied, a second terminal connected to the second node, and a gate terminal to which a data write gate signal is supplied, wherein the eighth switching transistor supplies the data voltage to the first terminal of the driving transistor when the eighth switching transistor is turned on.

10. The pixel of claim 1, further comprising:

a storage capacitor including a first electrode to which a first power supply voltage that is higher than the second power supply voltage is applied and a second electrode connected to the gate terminal of the driving transistor, wherein the storage capacitor maintains a voltage level of the gate terminal of the driving transistor.

11. A pixel comprising:

a first switching transistor including a first terminal to which a bias power supply voltage is applied, a second terminal connected to a first node, and a gate terminal to which a light emitting element initialization signal is applied;

a second switching transistor including a first terminal connected to the first node, a second terminal connected to a second node, a gate terminal to which the light emitting element initialization signal is applied;

a driving transistor including a first terminal connected to the second node, a second terminal connected to a third node, a first gate terminal, and a second gate terminal connected to the first node; and a light emitting element including a first terminal electrically connected to the driving transistor and a second terminal to which a second power supply voltage is supplied, wherein the bias power supply voltage having a first voltage level is applied to the second node via the first and second switching transistors when the first and second switching transistors are turned on, and wherein the bias power supply voltage having a second voltage level is applied to the second gate terminal of the driving transistor via the first switching transistor when the first and second switching transistors are turned on.

12. The pixel of claim 11, wherein the first switching transistor and the second switching transistor are connected to each other in series.

13. The pixel of claim 11, wherein the first voltage level of the bias power supply voltage is different from the second voltage level of the bias power supply voltage.

14. The pixel of claim 11, wherein the driving transistor is in an on-bias state when the bias power supply voltage having the first voltage level is applied to the second node and when the bias power supply voltage having the second voltage level is applied to the second gate terminal of the driving transistor.

15. The pixel of claim 11, further comprising:

a third switching transistor including a first terminal connected to the gate terminal of the driving transistor, a second terminal connected to the third node, and a gate terminal to which a compensation gate signal is supplied, wherein the third switching transistor diode-connects the driving transistor when the third switching transistor is turned on.

16. The pixel of claim 11, further comprising:

a fourth switching transistor including a first terminal to which a first initialization voltage is supplied, a second terminal connected to the gate terminal of the driving transistor, and a gate terminal to which a data initialization gate signal is supplied, wherein the fourth switching transistor initializes the gate terminal of the driving transistor to the first initialization voltage when the fourth switching transistor is turned on.

17. The pixel of claim 11, further comprising:

a fifth switching transistor including a first terminal to which a second initialization voltage is supplied, a second terminal connected to the first terminal of the light emitting element, and a gate terminal to which the light emitting element initialization signal is supplied, wherein the fifth switching transistor initializes the first terminal of the light emitting element to the second initialization voltage when the fifth switching transistor is turned on.

18. The pixel of claim 11, further comprising:

a sixth switching transistor including a first terminal to which a first power supply voltage that is higher than the second power supply voltage is supplied, a second terminal connected to the second node, and a gate terminal to which an emission signal is applied; and a seventh switching transistor including a first terminal connected to the third node, a second terminal connected to the first terminal of the light emitting element, and a gate terminal to which the emission signal is applied, wherein the sixth and seventh switching transistors allow a driving current generated by the driving transistor to flow through the light emitting element between the first power supply voltage and the second power supply voltage when the sixth and seventh switching transistors are turned on.

19. The pixel of claim 11, further comprising:

an eighth switching transistor including a first terminal to which a data voltage is supplied, a second terminal connected to the second node, and a gate terminal to which a data write gate signal is supplied, wherein the eighth switching transistor supplies the data voltage to the first terminal of the driving transistor when the eighth switching transistor is turned on.

20. The pixel of claim 11, further comprising:

a storage capacitor including a first electrode to which a first power supply voltage that is higher than the second power supply voltage is applied and a second electrode connected to the gate terminal of the driving transistor, wherein the storage capacitor maintains a voltage level of the gate terminal of the driving transistor.

* * * * *